March 10, 1942. H. A. WERFEL 2,275,876
DETACHABLE HANDLE FOR UTENSILS
Filed May 21, 1941
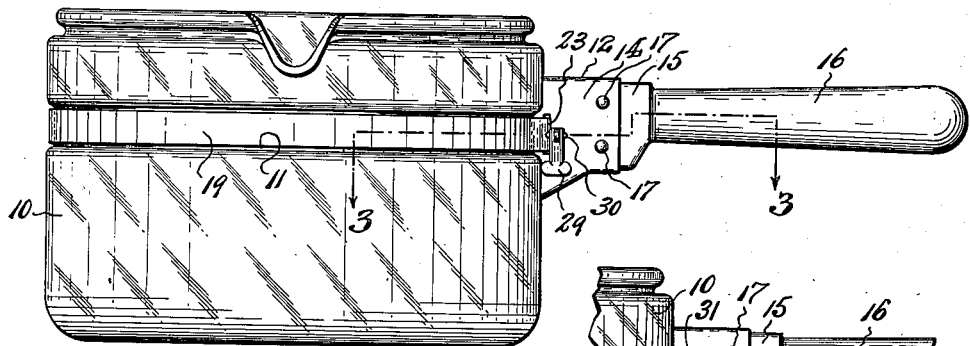
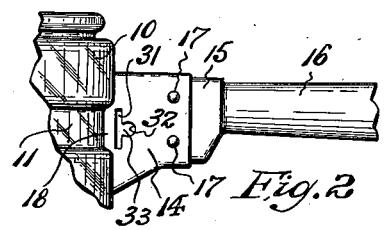
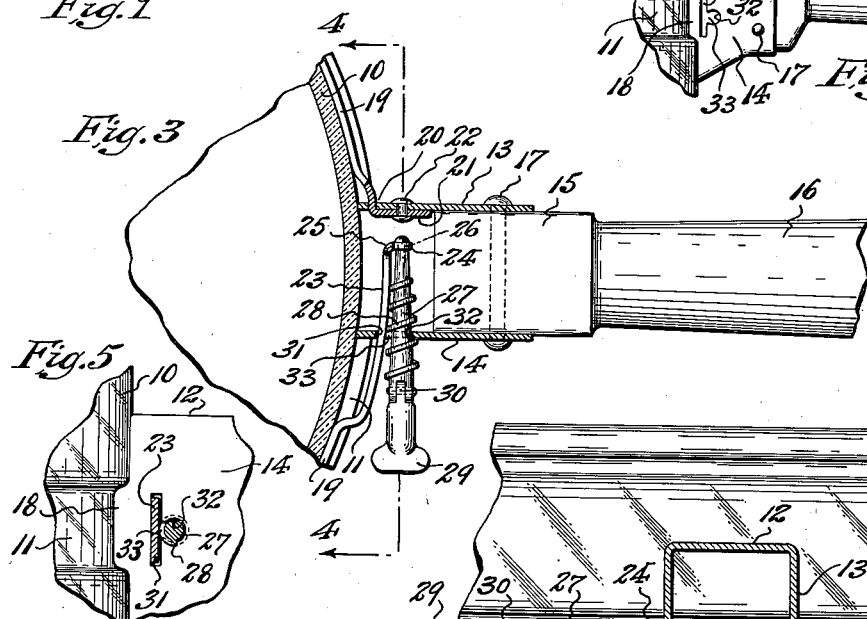
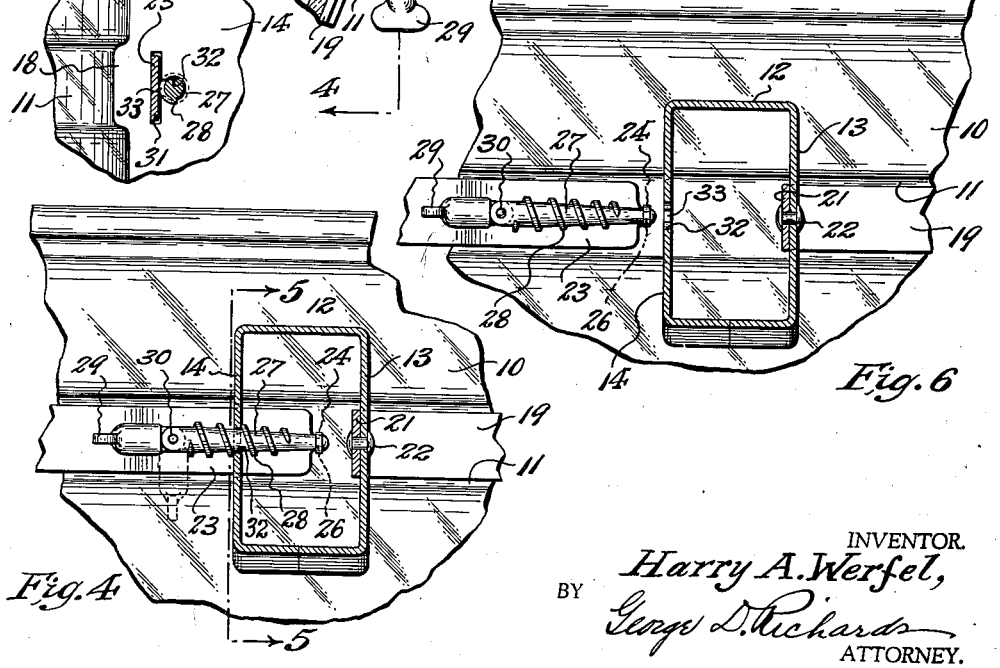
INVENTOR.
Harry A. Werfel,
BY George D. Richards
ATTORNEY.

Patented Mar. 10, 1942

2,275,876

UNITED STATES PATENT OFFICE 2,275,876

DETACHABLE HANDLE FOR UTENSILS

Harry A. Werfel, Essex Fells, N. J., assignor to Jennings Silver Company, Irvington, N. J., a corporation of New Jersey Application May 21, 1941, Serial No. 394,452

5 Claims. (Cl. 16—114)

This invention relates to improvements in detachable handles for cooking and other utensils; and the invention has reference, more particularly, to further improvements in detachable handle structures of the general type and character disclosed in my co-pending application for United States Letters Patent Serial No. 388,595, filed April 15, 1941.

This invention has for an object to provide an easily and quickly manipulatable detachable handle structure for utensils which includes a discontinuous clamp band from which a handle member extends, and which is adapted to be closed around a utensil so as to embrace and hold the same subject to carrying by the handle member, wherein a novel self-contained releasable means is provided for closing and securing the band in operative applied relation to the utensil, said means being easily manipulated to tighten the band into immovable, frictionally bound, gripping relation to the utensil body, but in such manner as not to unduly stress or strain the material of which the utensil body is made, especially when the latter is made of glass, porcelain, earthenware or similar materials.

Other objects of this invention, not at this time more particularly enumerated, will be understood from the following detailed description of the same.

Fig. 1 is a side elevational view showing a utensil in the form of a glass sauce-pan equipped with the novel detachable handle structure of this invention; Fig. 2 is a fragmentary side view showing the slotted abutment member of the handle structure; Fig. 3 is a fragmentary horizontal sectional view, taken on line 3—3 in Fig. 1, but drawn on an enlarged scale; Fig. 4 is a transverse sectional view, taken on line 4—4 in Fig. 3; Fig. 5 is a fragmentary vertical sectional view, taken on line 5—5 in Fig. 4; and Fig. 6 is a view similar to that of Fig. 4, but showing the means for closing and securing the clamp band in released condition, to permit detachment of the handle structure from the utensil body.

Similar characters of reference are employed in the hereinabove described views, to indicate corresponding parts.

Referring to the drawing, the reference character 10 indicates a utensil body, illustratively shown in the form of a sauce-pan made of glass, although it will be understood that the utensil may be of any other body form, and may be made of any other suitable material. The novel detachable handle structure of this invention is, however, especially adapted for use with utensils made of glass or ceramic materials.

Preferably the utensil body 10 is formed with an externally disposed annular channel 11, suitably located intermediate its top and bottom, whereby to receive the clamp band portion of the detachable handle structure desired to be applied thereto.

According to the instant invention, the detachable handle structure comprises a hollow abutment member 12 having spaced side walls 13 and 14. Said abutment member 12 may be made of any suitable material, but is preferably made of sheet metal, and is suitably formed at its outer end portion to receive and support the butt portion 15 of a suitably shaped handle member 16, which is adapted to extend outwardly therefrom. Illustrative of one method of mounting the handle member in connection with said abutment member 12, as shown, the latter is provided with an outer open end into which the butt portion 15 of the handle member 16 is inserted, and then suitably rigidly secured thereto, as, for example, by transverse fastening rivets 17 passed through the outer end portion of said abutment member and the butt portion 15 of said handle member assembled therewith. The inner extremity of said abutment member 12 is shaped to conform to the surface contours of the utensil body 10 to which it is applied, and when said utensil body is provided with the annular chamber 11 above mentioned, the side walls 13 and 14 of said abutment member are preferably provided with projecting ears 18 adapted to conform to and enter said channel 11, and thus hold the abutment member, when operatively applied to the utensil body, against perpendicular shift or displacement relative to the latter.

Anchored to said abutment member, for extension therefrom, is one end of a discontinuous clamp band 19. A preferred method of so anchoring said clamp band is to provide one side wall of the abutment member 12, e. g. the side wall 13 with a slot 20 through which an end portion of the clamp band 19 may be passed. The inwardly projecting end portion of the inserted clamp band end portion is angularly turned to lie against the inner face of said side wall, thus providing an angular anchor lug 21 adapted to be fixedly secured to said side wall, as by a fastening rivet 22 as shown, or in any other suitable manner, such e. g. as by welding the anchor lug to said abutment side wall.

The clamp band, as thus affixed by one end to the abutment member 12, forms a loop having a free end portion 23, whereby the band may be opened and expanded to facilitate engaging the same over and into encircling and embracing relation to the utensil body 10.

Means is provided to not only releasably couple said free end portion 23 of the clamp band to the abutment member 12, whereby to close the clamp band around the utensil body, but also so as to constrict the clamp band into tightened, frictionally bound, non-slipping engagement with said utensil body. According to the instant invention such means comprises a rotatable coupling screw device which is carried by said free end portion 23 of the clamp band. Formed in connection with the extremity of said free end portion 23 is an angularly and outwardly extending perforate bearing ear 24, which is connected to said extremity by a narrow, integral connecting neck 25. Journaled for swiveling rotation in said bearing ear 24 is an axial journal stud 26 which projects axially from the forward end of the shank 27 of a coupling screw, which shank is provided with a suitably pitched screw-thread 28 formed around the same. Such coupling screw, as thus rotatably mounted in connection with the free end portion 23 of the clamp band, extends rearwardly along and contiguous to the outer face of said clamp band end portion. If desired, said coupling screw may be of a form tapering toward the forward etxremity thereof which is rotatably journaled and supported by said bearing ear 24. The rearward end of said coupling screw is provided with a finger piece 29 for manipulating the same. Preferably said finger piece is hingedly connected to the coupling screw by means of a hinge connection 30, whereby, when not in use, said finger piece may be downfolded or turned angularly relative to the axis of said coupling screw.

Formed in the opposite side wall of the abutment member 12, i. e. in the side wall 14, is a perpendicular slot 31 and a circular opening 32 outwardly offset therefrom, said opening having a gap 33 at its inner side in communication with said slot 31 (see Fig. 2). Said slot 31 receives and permits inward passage therethrough of the inner free end portion 23 of the clamp band, while the opening 32 receives and permits inward passage of the bearing ear 24 and the shank 27 of the coupling screw; said gap 33 permitting passage of the connecting neck 25 which extends between said bearing ear 24 and the extremity of the clamp band end portion 23. The opening 32 is so sized as to pass the coupling screw shank in such manner that the screw threads 28 will engage the marginal periphery of said opening 32; in other words, the coupling screw, when rotated will screw through the opening 32 in such manner that the side wall 14 of the abutment member 12 functions as a stationary nut in cooperation with said coupling screw.

To apply the detachable handle structure to the utensil body 10, the free end portion 23 of the clamp band 19 being disconnected from the abutment member 12, said clamp band is expanded so as to pass downwardly over the utensil body 10, and into alignment with the channel 11 with which the latter is provided. At the same time the abutment member 12 is caused to abut the exterior side of the utensil body 10 at a desired point, with the ears 18 thereof entered in the channel 11 of the latter (see Fig. 2). When the clamp band and abutment member are thus positioned, the free end portion of the clamp band and the coupling screw are respectively opposed to the slot 31 and opening 32 ready to be entered therethrough (see Fig. 6). The operator thereupon contracts the clamp band so as to push the free end portion thereof inwardly through the slot 31, thereby causing the bearing ear 24 and its connecting neck 25 to pass through the opening 32 and its gap 33, thus entering the leading or forward end of the coupling screw through said opening 32 as far as it will go until stopped by the abutment of the screw-threads 28 against the marginal portions of said opening 32. The parts having been thus initially assembled, the operator may thereupon complete closing and securing of the clamp band in encircling relation to the utensil body 10, and so as to constrict the same into close hugging and taut frictionally bound, non-slipping engagement with the latter, and so that the handle member 16 is rigidly supported in outward extension therefrom, and in condition for use in lifting and carrying the utensil about. This last operation is accomplished by grasping the finger piece 29 and moving the same into axial alignment with the coupling screw shank 27, and thereupon manipulating the same to turn and inwardly move the coupling screw, while the threads 28 thereof thrust against the marginal portions of the opening 32. As the coupling screw is thus screwed inwardly, it forces the free end portion 23 of the clamp band 19 toward the fixed or anchored end thereof, thus constricting and tightening home the clamp band to the proper degree required to attain the desired tight and non-slipping embrace of the utensil body, and yet without unduly stressing or straining the material of which the body is made. The pitch of the coupling screw is so selected that the screw will not reversely rotate or relax under back thrusting pressure of the tightened clamp band, and consequently the clamp band is also locked so as to be firmly retained against any accidental relaxation of its grip upon the utensil.

When the clamp band end portion is engaged in the slot 31 it closes the gap 33, whereby to prevent any possible lateral displacement of the coupling screw relative to the opening 32 through which it is operatively engaged.

To detach the handle structure from the utensil body 10, it is merely necessary to reversely rotate and retract the coupling screw until the same is disengaged from the wall 14 of the abutment member 12, whereupon the free end portion 23 of the clamp band may be withdrawn from said abutment member, and the clamp band then expanded for removal from the utensil body.

It will be obvious that the releaseable means for closing and securing the clamp band in operative encircling relation to the utensil body provides a readily manipulatable device which is a self-contained part of the handle structure, thus avoiding all necessity for the use of tools in operation thereof, as well as use of separable fastener elements which involve risk of loosening or accidental release and separation entailing possible loss thereof.

Although in the above description, it has been pointed out that a preferable arrangement and use of this invention contemplates one wherein the free end portion 23 of the clamp band may be entirely disconnected or freed from the abutment member 12 by wholly withdrawing the coupling screw 27—28 from engagement with the wall 14 of the latter, such arrangement and mode of operation is not absolutely necessary, since said coupling screw 27—28 may be backed out without wholly disconnecting the same from the abutment member wall 14, but merely for a distance sufficient to retract the free end portion 23 of the clamp band far enough to assure such expansion of the clamp band loop as will permit the latter to move out of the utensil body channel 11 and its subsequent movement outwardly over the top or bottom end portion of the utensil body 10. It will therefore be understood that this invention, in its broader aspects as hereinafter claimed, is not to be deemed limited necessarily to a construction or mode of operation which involves complete separation or disconnection of the free or movable end portion of the clamp band from the abutment member 12.

It will be understood that various other changes could be made in the above described constructions, and that other embodiments of the principles of this invention could be made without departing from the scope thereof as defined in the following claims. It is therefore intended that all matter contained in the foregoing descripiton or shown in the accompanying drawing shall be interpreted as illustrative and not in a limiting sense.

I claim:

1. A detachable handle for utensils comprising, a hollow abutment member to engage the utensil body, the same having a handle member affixed to its outer end portion for extension therefrom, a clamp band having one end anchored to one side wall of said abutment member and the other end movably related to the opposite side wall thereof, said movable end portion of said clamp band having offset bearing means, a manipulatable screw means having a swiveling connection with said bearing means, whereby said screw means is carried by and disposed in parallel extension contiguous to said movable end portion of the clamp band, said opposite side wall of said abutment member being perforated to pass said clamp band and to receive said screw means so as to thrustingly engage its screw threads therewith, and the rearward external end portion of said screw means having a finger piece for manipulating the same.

2. A detachable handle for utensils comprising, a handle structure adapted to abut a utensil body for outward extension therefrom, a clamp band having one end anchored to said handle structure and the other end free, the free end portion of said clamp band having offset bearing means, a manipulatable coupling screw having a swiveling connection with said bearing means, whereby said screw is rotatably mounted upon and for extension along said clamp band free end portion in parallel outwardly offset relation thereto, said handle structure having an opening to pass and receive said clamp band free end portion and said coupling screw, and said opening having peripheral portions to thrustingly engage the threads of said coupling screw for the purposes described, and the external end portion of said coupling screw having means to facilitate manipulation thereof.

3. A detachable handle means for utensils comprising, a hollow abutment member to engage the utensil body and having a handle member affixed to its outer end portion for extension therefrom, a clamp band having one end anchored to one side wall of said abutment member and the other end free, a manipulatable coupling screw extending along the free end portion of said clamp band in swiveled connection therewith, and the other side wall of said abutment member being perforated to pass said clamp band free end portion and to receive said coupling screw so as to thrustingly engage its screw threads with said latter side wall.

4. A detachable handle means for utensils comprising, a hollow abutment member to engage the utensil body and having a handle member affixed to its outer end portion for extension therefrom, a clamp band having one end anchored to one side wall of said abutment member and the other end free, the free end portion of said clamp band having offset bearing means, a manipulatable coupling screw having a swiveling connection with said bearing means, whereby said screw is rotatably mounted upon and for extension along said clamp band free end portion in offset parallel relation thereto, and the other side wall of said abutment member being perforated to pass said clamp band free end portion and to receive said coupling screw so as to thrustingly engage its screw threads with said latter side wall.

5. A detachable handle means for utensils comprising, a hollow abutment member to engage the utensil body and having a handle member affixed to its outer end portion for extension therefrom, a clamp band having one end anchored to one side wall of said abutment member and the other end free, an angular bearing member connected by an offsetting neck portion with the extremity of said clamp band free end portion, a manipulatable coupling screw having an axially projecting journal stud at its forward end in swiveling connection with said bearing member, whereby said screw extends rearwardly along and parallel to said clamp band free end portion in offset relation thereto, the other side wall of said abutment member being conformingly perforated to receive said clamp band free end portion and to pass the bearing member and its neck through said wall and so as to receive said coupling screw whereby to thrustingly engage the screw threads thereof with said wall, and the rearward end of said coupling screw having finger piece means for manipulating the same.

HARRY A. WERFEL.